United States Patent Office 2,860,948
Patented Nov. 18, 1958

2,860,948

SEPARATION OF NEPTUNIUM FROM PLUTONIUM BY CHLORINATION AND SUBLIMATION

Sherman M. Fried, Chicago, Ill., assignor to the United States of America as represented by the United States Atomic Energy Commission No Drawing. Application May 24, 1949
Serial No. 95,150

9 Claims. (Cl. 23—14.5)

This invention relates to the separation of heavy metals and more particularly to the separation of neptunium from plutonium.

It is an object of this invention to provide a method for the rapid and complete separation of neptunium values from plutonium values.

Heretofore the means for recovery of neptunium values have been limited to those reactions wherein neptunium is contained in aqueous solutions or in organic solvents. A further object of this invention is to provide an alternative process which involves only the procedures of dry chemistry for the separation and successful isolation of neptunium values from plutonium values and recovery of said neptunium in the form of an anyhdrous chloride of neptunium.

Further objects and advantages will be apparent from the following disclosure.

The references made throughout this specification and in the appended claims to neptunium or to plutonium or to any of their respective compounds are to be construed as including all isotopes of these meals. While the process of this invention is applicable to even the short-lived isotopes of neptunium, most probably the process will find considerable application in separations directed toward the isolation of the long-lived isotope $Np^{237}$, which latter isotope can be successfully substituted for the radium used in radium therapy.

I have discovered a process for the separation of neptunium values from plutonium values which comprises fractionally subliming a higher chloride of neptunium from a lower chloride of plutonium by heating a mixture containing a chloride of neptunium wherein said neptunium is in a valence state higher than 3 and a chloride of plutonium wherein said plutonium is not in excess of 3 and then cooling the neptunium vapors. The fractional sublimation of the higher valent neptunium chloride is effected upon heating at a temperature from about 300 to 700° C. and preferably between 400 and 500° C. and usually at 450° C. Since the higher chloride of neptunium is the more volatile, the neptunium readily sublimes at temperatures between 400 and 700° C., preferably between 400 and 500° C., while the pure plutonium trichloride is normally sublimed only at temperatures in excess of 700° C. The volatilized material is then condensed in a zone cooler than the zone in which the chloride (or chlorides) is initially sublimed during its formation. Since the vapor pressure of the tetrachloride of neptunium, which is estimated to be about $10^{-1}$ mm. at 450° C., is greater than that of plutonium trichloride at this same temperature level, the neptunium compound readily sublimes and selectively condenses in a zone farther removed from the heating zone than the zone in which the lower chloride of plutonium condenses. At 450° C. the vapor pressure of plutonium trichloride, is $10^{-6}$ mm. but if associated with neptunium, it volatilizes in detectable amounts only if the zone containing the plutonium is heated above 650° C.

The fractional sublimation of the higher chloride of neptunium from the lower chloride of plutonium is more easily effected in vacuo since the use of vacuum facilitates transfer of the more volatile compound to a cooler zone and thereby assists in effecting the selective condensation of the separated compounds. The separation factors obtained by adaptation of the process of this invention to either vacuum or flow methods are of the order of at least 3000 when carried out on samples weighing about 100 micrograms to about 65 milligrams; on larger scales, separation factors as high as 10,000 can be attained.

A further embodiment of this invention involves the separation of neptunium values from plutonium values from those mixtures containing these values preferably in the form of their respective oxygen-containing compounds. Throughout this specification and in the appended claims, the term "oxygen-containing" as applied to compounds of either neptunium or plutonium is to be construed as meaning any compound which is readily converted by heat to its respective metal oxide. The oxides, oxalates, carbonates, nitrates, and oxygenated (e. g. neptunyl) compounds of neptunium and plutonium are examples of those compounds which can be suitably used either singly or in combination in the preparation of their respective anhydrous chlorides. The preferred oxygen-containing compounds for use in the process of this invention are those wherein plutonium is already in the trivalent state and neptunium is present as tetravalent neptunium. Tetravalent neptunium oxalate and trivalent plutonium oxalate are examples of compounds which would require no valence change in forming the chlorides separable by the process of this invention. A mixture of neptunium metal and plutonium metal can react with chlorine gas to form respectively plutonium trichloride and neptunium tetrachloride.

In general, oxygen-containing compounds of plutonium wherein plutonium is in the tetravalent state are also suitable for separation from neptunium according to the process of this invention, since even if plutonium tetrachloride is formed, this compound is stable only at extremely high temperatures and on cooling breaks down to free chlorine and condenses as plutonium trichloride.

In accordance with this further embodiment of the present invention, a mixture containing neptunium values and plutonium values in the form of their respective oxygen-containing compounds is heated at a temperature between 300 and 800° C., preferably between 600 and 700° C., while in contact with carbon and chlorine, the latter elements being present preferably in the form of a chlorine-containing compound, such as carbon tetrachloride. Since the chloride of neptunium formed during this reaction is more volatile than the chloride of plutonium formed by the same reaction, the neptunium volatilizes from the starting mixture and condenses in a zone cooler than the reaction zone. The optium temperature for the formation of these mixed chlorides is between 600 and 700° C. At lower temperatures, the rate for the formation of the chlorides of either neptunium or plutonium is too slow to be efficient and at temperatures higher than 700° C., the trichloride of plutonium sublimes from the reaction vessel in appreciable amounts. If the temperature is maintained at a level favoring the retention of plutonium trichloride in the residue, a more complete separation of neptunium values from plutonium values can be effected, and this necessitates only a minium number of resublimations of the product or products formed.

The separation process, which comprises sublimation and condensation and any resublimation of the resultant chlorides is preferably effected in vacuo. The products are thereby condensed within more sharply defined zones in contrast to the "dusting" observed when the formation and initial volatilization are carried out under ordinary atmospheric conditions. As an alternative to the use of vacuum, a flow system can be used, but in the latter event extreme caution must be used in order to prevent "dusting" and to effect isolation of the products in separate and distinct zones. A flow system requires the use of such expedients as lower temperature, slow flow rate and the use of quartz wool plugs or like substances to inhibit the passage of the dust of the less volatile compound from the heating zone. Furthermore, in the absence of vacuum, the yield of neptunium tetrachloride is substantially decreased since this product tends to adhere to the walls of the reaction vessel and the adherent product is resublimed only with difficulty and tends to become contaminated with oxygen.

Therefore, it can be seen that since neptunium and plutonium values can be sublimed and collected in distinct zones, these products are recoverable in virtually a pure state. The individually collected condensates can be successively resublimed in order to effect further and more complete isolation of the individual compounds from the fractions initially obtained. It is recommended in the isolation of neptunium that the neptunium tetrachloride fraction be subjected to at least one resublimation following and in addition to the initial sublimation concomitant with its formation.

In the principal embodiments of this invention the preferred chlorinating agent is chlorine and carbon, preferably in the form of a chlorine-containing compound, namely, carbon tetrachloride which reacts with oxides of plutonium in the manner set forth in the copending application of Norman R. Davidson and Joseph Katz, Serial No. 752,270, filed June 3, 1947. The analogous reaction for oxides of neptunium with carbon tetrachloride is disclosed in the copending application of Sherman Fried and Norman R. Davidson, Serial No. 768,058, filed August 11, 1947 and patented on December 11, 1951, as U. S. Patent No. 2,578,416. In the present invention the carbon likewise serves to remove oxygen from the reaction system either as carbon monoxide, carbon dioxide, or a mixture of both oxides of carbon. Moreover, it is advisable to degas the carbon tetrachloride prior to its use in the process of this invention in order to remove any oxygen impurities or oxygen-containing compounds which might inhibit the reaction by favoring oxidation of plutonium to the tetravalent state. Whenever a flow method is employed in carrying out the process of this invention, an inert gas such as argon or nitrogen is commonly used as a carrier for the carbon tetrachloride vapor and it is also advisable to remove any traces of oxygen and moisture from the carrier gas as well as from the chlorine reactant.

The apparatus for carrying out the process of this invention is made of either quartz or glass since, at the reaction temperatures used, platinum tends to catalyze the deposition of carbon thereby contaminating the product to a certain extent and the presence of platinum in a system containing chlorine is also prohibitive. The reaction vessel is designed so as to provide a surface cooler than the reaction zone on which to condense the product formed. Tubular reaction vessels are well adapted for this purpose and they are conveniently inserted within a block- or coil-type heating unit so as to heat only the portion containing the reactants or, when desired, only those zones in which certain fractions of the product have condensed. The conventional heating coil heated by electrical or induction means is a convenient device. The tube containing the solid reactants is connected with a tube common to both a source of vacuum and the chlorinating agent. The tube is fitted with stopcocks so as to permit the solid reactants alternate access to the source of vacuum and the chorinating agent.

*Example I*

A neptunium-plutonium mixture in the form of the dry hydroxides of these metals is placed within a pyrex reaction tube which is then inserted in a heating coil. Nitrogen of high purity is bubbled through carbon tetrachloride maintained at ice-bath temperature and the nitrogen gas containing the carbon tetrachloride vapor is passed in contact with the sample heated to 600° C. The resultant neptunium tetrachloride sublimes as formed and is condensed in a cooler portion of the tube extending beyond the heating unit. This sublimate is then resublimed by moving the heating unit along the tube and heating the condensed neptunium tetrachloride fraction to a temperature between 400 and 500° C. During each application of heat the neptunium tetrachloride sublimes from the plutonium trichloride, the latter remaining as a residue. A 96 percent yield of $NpCl_4$ was recovered from a 7.0 milligram sample containing 0.6 percent by weight plutonium in the original neptunium-plutonium mixture. The extent of plutonium contamination in the neptunium tetrachloride recovered was $3 \times 10^{-3}$ percent by weight which is the lower limit detectable by the method of pulse analysis.

*Example II*

A 65 milligram sample containing a mixture of neptunium and plutonium hydroxides was precipitated by the addition of ammonium hydroxide to a 1 M sulfuric acid solution containing 10.06 milligrams of neptunium per cubic centimeter. The starting mixture of neptunium and plutonium hydroxide contained plutonium to the extent of about 4 percent by weight. The precipitated hydroxide mixture was centrifuged, washed once with water and dried from five to ten hours at 70° C. The solid dry material was then transferred to the apparatus previously described, only 1.31 milligrams being lost during the transfer by adherence to the sides of the centrifuge cone. The remaining sample was then heated at 650° C. in contact with carbon tetrachloride vapor while alternately evacuating and then closing the vacuum line and opening the line leading to the carbon tetrachloride reservoir. After heating the sample in a 3 millimeter quartz tube for about ten hours, the orange-red crystalline neptunium tetrachloride product was deposited in a zone about 5 centimeters removed from the closed end of the tube containing the original mixture. The major portion of the plutonium remained as a bluish-green crystalline residue ($PuCl_3$), while a minor fraction of the plutonium trichloride sublimed with, and collected in the zone immediately below, the neptunium tetrachloride sublimate. The portion of the tube containing the plutonium fraction was sealed off from the remainder of the tube and the zone containing the sublimed neptunium tetrachloride was then covered by the heating element now maintained at 450° C. in order to resublime the neptunium tetrachloride. After resublimation, the product was sealed off in vacuo and the tube containing the resultant 99.52 milligrams of neptunium tetrachloride was reopened in a dry box.

*Example III*

Mixed hydroxides of plutonium and neptunium were precipitated by the addition of ammonium hydroxide to a 1 M solution of sulfuric acid containing 10.06 milligrams of neptunium per milliliter as the sulfate and about 4 percent by weight plutonium. The mixture of precipitated hydroxides was centrifuged, washed, recentrifuged and finally dried overnight at 70° C. The dried pellet weighing 20.12 milligrams and containing the neptunium and plutonium values, presumably as their oxides, was then introduced into a 4 millimeter quartz tube and connected to a line leading to both the chlorinating agent and source of vacuum. The pellet containing the neptunium and plutonium values was heated to 650° C. in contact with the carbon tetrachloride vapor during which heating the carbon tetrachloride vapor was occasionally evacuated and readmitted by manipulation of the stopcocks during a treatment period totalling approximately five hours. During condensation of the neptunium tetrachloride, the zone immediately below the neptunium condensation zone was heated in order to distribute the condensed product sufficiently to preclude obstruction of the tube at the point of condensation and to permit ready access to the carbon tetrachloride vapor throughout the entire reaction and collection zones. After all the neptunium tetrachloride had been sublimed from the blue-green plutonium trichloride residue, the portion of the tube containing the plutonium residue was sealed off from the remainder. The zone containing the neptunium tetrachloride was sealed off at both ends and the zone containing the major portion of condensed neptunium tetrachloride was reheated to 450° C. thereby resubliming the neptunium tetrachloride from any contaminating plutonium which remained unvolatilized in the heated region of the tube. The neptunium tetrachloride sublimed and condensed in the remaining cooler portion of the tube and 26.37 milligrams of neptunium tetrachloride were recovered therefrom upon breaking open the tube in a dry box. A pulse analysis of the product showed less than the lower limit of plutonium detectable by this method which is 0.1 percent plutonium in terms of radiation counts corresponding to $1.1 \times 10^{-3}$ percent plutonium by weight. The separation factor for plutonium is, therefore, calculated to be 3700 based on the percent plutonium present in the sample before purification compared with the amount after purification.

The foregoing descriptions will serve to illustrate the preferred embodiments of this invention. However, many alterations and changes will be apparent to those skilled in the art and such alterations and changes may be made therein without departure from the spirit and scope of this invention which are set forth in the appended claims and which are intended to cover all features of novelty disclosed herein, taken either singly or in combination.

What is claimed is:

1. A process for separation of neptunium values from plutonium values comprising chlorinating a mixture containing the oxides of said values by contact with carbon tetrachloride at a temperature of between 400 and 500° C. to convert the neptunium to neptunium tetrachloride and the plutonium to plutonium trichloride, and subliming the neptunium tetrachloride from the plutonium trichloride.

2. Process of claim 1 wherein the carbon tetrachloride is mixed with an inert gaseous carrier.

3. A process for the separation of neptunium values from plutonium values comprising heating in vacuo a mixture containing an oxygen-containing compound of neptunium and an oxygen-containing compound of plutonium with carbon and chlorine at a temperature between 300 and 800° C. so as to form neptunium tetrachloride, cooling and condensing the neptunium tetrachloride fraction in a separate zone cooler than the reaction zone and fractionally resubliming the neptunium tetrachloride from any plutonium trichloride.

4. The process of claim 3 wherein the reaction between the mixture of oxygen-containing neptunium compounds and oxygen-containing plutonium compounds with carbon and chlorine is effected in vacuo at a temperature between 600 and 700° C.

5. A process for the separation of neptunium values from plutonium values comprising heating a mixture of oxygen-containing compounds of neptunium and oxygen-containing compounds of plutonium with carbon tetrachloride at a temperature between 600 and 700° C. whereby chlorides of neptunium and plutonium are both formed and neptunium tetrachloride is selectively sublimed, and condensing neptunium tetrachloride.

6. The process of claim 5 wherein the sublimation is effected by heating in vacuo.

7. The process of claim 5 wherein the resultant condensed neptunium tetrachloride fraction and the plutonium trichloride fraction are separately resublimed, cooled and recondensed in distinct zones and separately collected from said zones.

8. Process of claim 5 wherein the neptunium chloride fraction is resublimed in vacuo at a temperature between 400 and 500° C. and the plutonium trichloride fraction is resublimed in vacuo at a temperature in excess of 700° C.

9. A process for the separation of neptunium as neptunium tetrachloride from a mixture of neptunium values and plutonium values comprising heating in vacuo a mixture of neptunium and plutonium present as their respective oxygen-containing compounds in contact with carbon tetrachloride at a temperature between 300 and 700° C. to form respectively neptunium tetrachloride and plutonium trichloride, cooling and condensing said neptunium tetrachloride, as formed, on a surface cooler than the condensation temperature for said neptunium tetrachloride.

References Cited in the file of this patent

UNITED STATES PATENTS

| | | |
|---|---|---|
| 1,147,832 | Von Kugelgen et al. | July 27, 1915 |
| 1,434,485 | D'Adrian | Nov. 7, 1922 |
| 1,434,486 | D'Adrian | Nov. 7, 1922 |

FOREIGN PATENTS

| | | |
|---|---|---|
| 487,834 | Great Britain | June 22, 1938 |
| 564,797 | Great Britain | Oct. 13, 1944 |

OTHER REFERENCES

AEC Document ANL-4224, November 23, 1948; declassified December 13, 1955; pages 1–10.